United States Patent [19]

Stüfler et al.

[11] Patent Number: 4,959,754
[45] Date of Patent: Sep. 25, 1990

[54] ELECTROLYTIC CAPACITOR

[75] Inventors: Siegfried Stüfler, Klagenfurt; Georg Hetzendorf, Vienna, both of Austria; Benedictus C. H. Fransen; Antonius G. Rijnbeek, both of Eindhoven, Netherlands; Helfried Schmickl, Vienna, Austria

[73] Assignee: U.S. Philips Corporation, New York, N.Y.

[21] Appl. No.: 387,453

[22] Filed: Jul. 28, 1989

[30] Foreign Application Priority Data

Aug. 16, 1988 [EP] European Pat. Off. ............ 88201740

[51] Int. Cl.⁵ .............................................. H01G 9/00
[52] U.S. Cl. ..................................... 361/527; 29/25.03
[58] Field of Search ............... 29/570.1; 361/523–527, 361/321

[56] References Cited

U.S. PATENT DOCUMENTS

| 3,498,861 | 3/1970 | Namikata et al. | 29/570.1 X |
| 3,679,944 | 7/1972 | Yoshimura et al. | 29/570.1 X |
| 4,039,905 | 8/1977 | Pearce et al. | 361/525 |
| 4,617,609 | 10/1986 | Utner et al. | 361/321 X |

FOREIGN PATENT DOCUMENTS

| 2657828 | 6/1978 | Fed. Rep. of Germany | 361/321 |
| 122758 | 10/1978 | Japan | 29/570.1 |

Primary Examiner—Donald A. Griffin
Attorney, Agent, or Firm—Norman N. Spain

[57] ABSTRACT

An electrolytic capacitor comprising a stack of capacitor elements, each capacitor element comprising an anode foil having a dielectric oxide layer as well as a cathode contact layer having a solid electrolytic material, and a readily mechanizable method of manufacturing such a capacitor is achieved in that the cathode contact layer has a porous spacing layer which is impregnated with the solid electrolytic material.

14 Claims, 2 Drawing Sheets

ELECTROLYTIC CAPACITOR

BACKGROUND OF THE INVENTION

The invention relates to an electrolytic capacitor comprising a stack of capacitor elements, each capacitor element comprising an anode foil having a dielectric oxide layer as well as a cathode contact layer having a solid electrolytic material.

The invention also relates to a method of manufacturing an electrolytic capacitor, in which capacitor elements are manufactured from an anode foil having a dielectric oxide layer on which a cathode contact layer having a solid electrolytic material is provided, after which a number of capacitor elements are formed into a stack.

In British Patent GB No. 1225601 a description is given of an electrolytic capacitor and a method of manufacturing thereof, in which a foil of a valve metal, for example aluminium or tantalum, is provided with a non-porous oxide film and coated by precipitation with a layer of a solid electrolytic material in the form of an electrically conductive complex salt of tetracyanoquinodimethan (TCNQ) in a polymer binder. A cathode contact strip is embedded in the solid electrolytic material, after which a roll or a stack of foils is formed.

For the manufacture of compact capacitors having homogeneous electrical properties a construction having a multilayer structure in the form of a stack of uniform capacitor elements is preferred. This is important, for example, for use in high frequency ranges. The electrolytic capacitor described in said British Patent Specification cannot be readily manufactured in a multilayer structure. The manner in which the cathode contact is provided is not very reliable. Due to the presence of a polymeric binder the solid electrolytic material exhibits a reduced conductivity and the contact with the oxide film is unsatisfactory, in particular in the (narrow) pores of the anode foil. Pores in the anode foil increase the surface area of the foil and, consequently, the capacitance of the capacitor.

SUMMARY OF THE INVENTION

It is an object of the invention to provide an electrolytic capacitor of a readily conceivable construction which can be manufactured readily. The capacitor should be compact and suitable to be constructed in the form of a leadless electronic component. The electrolytic capacitor should be constructed so that flat foils can be used. This has the advantage that the oxide film is not damaged, as may happen during winding in the case of a wound electrolytic foil capacitor, so that short-circuits and leakage currents are avoided. In this case, the self-regenerating properties of the electrolytic capacitor are used as little as possible. A further advantage of flat capacitor elements is that they enable the use of brittle foils, for example foils in which deep pores are etched to obtain a large surface area. A further object of the invention is to provide an electrolytic capacitor in which an accurately determined and preferably smallest possible quantity of the solid electrolytic material can be used. A further object of the invention is to provide a construction for a stacked electrolytic capacitor, in which the contact between the capacitor elements in the stack can be established in a reliable manner, preferably, in a part of the anode foil which is not capacitively used. An additional object of the invention is to provide a readily mechanizable method of manufacturing an electrolytic capacitor.

This object is achieved in accordance with the invention by an electrolytic capacitor of the type described in the opening paragraph, which is characterized in that the cathode contact layer comprises a porous ceramic spacing layer which is impregnated with the solid electrolytic material.

DETAILED DESCRIPTION OF THE INVENTION

Figure 1:
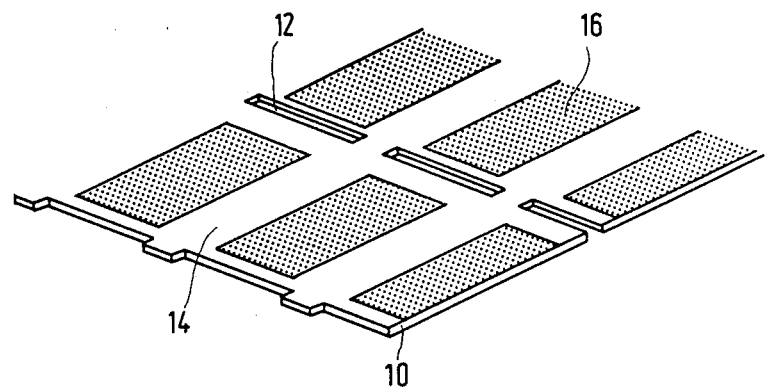
FIG. 1 is a diagrammatic elevational view of an anode foil having active and inactive portions.

An embodiment of the electrolytic capacitor in accordance with the invention, in which the risk of a short-circuit between the anode and the cathode is extremely small, is characterized in that, in accordance with a desired pattern, the surface of the anode foil is divided in active and inactive portions, the active portions being coated with the cathode contact layer, the inactive portions of the surface and a part of the edges of the anode foil being coated with an insulating layer, an electrically conductive layer being provided on top of the insulating layer, namely, from an insulated edge of the foil to the active portion of the surface.

In an efficient embodiment of the electrolytic capacitor in accordance with the invention, the surface of the anode foil comprises active portions on both sides.

Particularly reliable electrically conductive connections between the cathodes of the capacitor elements are obtained in that the electrically conductive layer at least partly covers the insulated edge of the foil.

In a preferred embodiment of the electrolytic capacitor in accordance with the invention, the cathode contact layers of the capacitor elements in the stack are interconnected through the electrically conductive layers at the edge of the foils.

Preferably, the anodes of the capacitor elements in the stack are electrically connected to one another through uninsulated edges of the foil.

A semi-conducting oxide such as manganese dioxide, possibly, in combination with graphite or a conducting polymer can be used as the solid electrolytic material. In a preferred embodiment of the electrolytic capacitor in accordance with the invention, the solid electrolytic material comprises a TCNQ salt. Suitable substances which can be provided in melted form are described in European Patent Application EP No. 152082 and in U.S. Pat. No. 4,590,541.

An additional advantage of the electrolytic capacitor in accordance with the invention is that a capacitor for a wide frequency range can be readily provided in that in the stack capacitor elements having highly etched and little-etched anode foils are used which are arranged parallel to one another. Highly-etched foils having many narrow pores and a large surface area provide a large capacitance. On the other hand, little-etched foils provide a low series resistance, thereby improving the electrical properties at high frequencies.

The object of providing a method of manufacturing an electrolytic capacitor is achieved in accordance with the invention by means of a method as described in the opening paragraph, in which, in accordance with a desired pattern, the surface of the anode foil is divided into active and inactive portions, the active portions being covered with the cathode contact layer which exhibits a porous ceramic spacing layer into which the solid electrolytic material is impregnated, the inactive portions of the surface and a part of the edges of the anode foil being covered with an insulating layer to which an electrically conductive layer is applied which extends from an insulated edge of the foil to the active portion of the surface.

The cathode contact layers of the capacitor elements in the stack on the one hand and the anode foils on the other hand are preferably interconnected through an end contact. To obtain a reliable electrically conductive connection it is efficacious to etch the parts of the stack to be contacted before the end contacts are provided. Methods of manufacturing end contacts are described in U.S. Pat. Nos. 1,098,494 and 4,685,027.

In a very efficacious embodiment of the method in accordance with the invention, in which accurate dosing is possible, the porous spacing layer and/or the solid electrolytic material are provided by means of screen printing.

In German Patent Specification DE No. 1639533 a description is given of an electrolytic capacitor in which a porous ceramic layer is used. This capacitor is not composed of a stack of foils but of a sintered metal body which is coated on the outside with a ceramic layer, so as to obtain a self-regenerating action of the capacitor in the case of a short-circuit.

The invention will be described in greater detail by means of an exemplary embodiment and with reference to the drawing.

EXAMPLE

In accordance with the present example, an etched anode foil of aluminium is used having a capacitance of from 10 to 20 $\mu F/cm^2$ at a foil voltage of 75 V. The anode foil having a thickness of approximately 100 $\mu m$ has pores on both sides which have a depth up to approximately 30 $\mu m$. A strip of anode foil measuring 400×500 $mm^2$ is clamped in a transport frame. This sheet of foil suffices for the manufacture of approximately 3500 capacitor elements.

In a punching operation the foil is provided with perforations at the locations where connections are formed between the cathode contacts. If desired, centering holes or holes for providing an envelope are also formed.

The anode foil is provided with an oxide film, in particular also in the pores, by forming at voltage of 75 V for 30 minutes in a 5% by weight solution of ammonium pentaborate in water, the solution comprising 0.1% by weight of $H_3PO_4$. Subsequently, a rinsing operation is conducted in demineralized water for 15 minutes, after which drying takes place at 105° C. for 5 to 10 minutes.

In accordance with a desired sample the anode foil is coated on both sides with a layer of an insulating material by means of screen printing, in which operation it is important that the edges of the foils in the perforations are also coated. It is thus ensured that the cathode contacts are subsequently electrically insulated relative to the anode foil. A soldering-masking layer may be used as the insulating material, as is customary in the case of printed circuit boards. A suitable material is, for example, a UV-curable substance on the basis of an acrylate, for example Dynacure type SM 15 LV marketed by Dynachem corporation Tustin, Calif., U.S.A. The layer is applied in a thickness of 15 $\mu m$ and is cured by exposure to UV light for 2 minutes.

FIG. 1 shows a part of an anode foil 10 having perforations 12 through which the cathode contacts are passed. The unhatched portions 14 are coated with the layer of insulating material and form the inactive portions of the surface of the anode foil.

The uninsulated, active portions 16 of the foil surface (see FIG. 1) are coated by screen printing with a porous ceramic spacing material, for example a suspension of $Al_2O_3$ in water and triethylene glycol with polyvinyl alcohol as a binder. The aluminium oxide particles have dimensions of from 1 to 5 $\mu m$. The thickness of the layer is 15 $\mu m$. The layer is dried by means of IR radiation at temperatures of from 105° to 205° C. for 5 minutes. The free volume of the porous layer is 15%. Instead of $Al_2O_3$, for example, barium titanate, titanium dioxide, quartz or glass may alternatively be used.

The anode foil is subjected to a post-forming treatment, which is carried out in the same manner as the forming treatment described above. If desired, the said forming treatment may be omitted so that at this stage forming is carried out for the first time.

In the screen printing process, a paste comprising a solid electrolytic material, for example containing polyacrylonitrile as the binder and dimethylformamide as the solvent, is provided. In accordance with this example, $BIC(TCNQ)_2$ is used as the electrolytic material, wherein BIC denotes the cation N-(n-butyl)-isoquinoline and TCNQ denotes the anion tetracyanoquinodimethan of the complex salt. The paste is provided with a thickness of 20 $\mu m$, and dried in a vacuum or an inert gas by exposure to IR light for 5 to 15 minutes at a temperature of from 50° to 150° C. Subsequently, the porous spacing material and the pores of the anode foil are impregnated with the electrolytic material which is heated for a short period of maximally 60 seconds to a temperature of 260° C. As an alternative to screen printing, the solid electrolytic material may also be provided by immersion in a melt.

Figure 2:
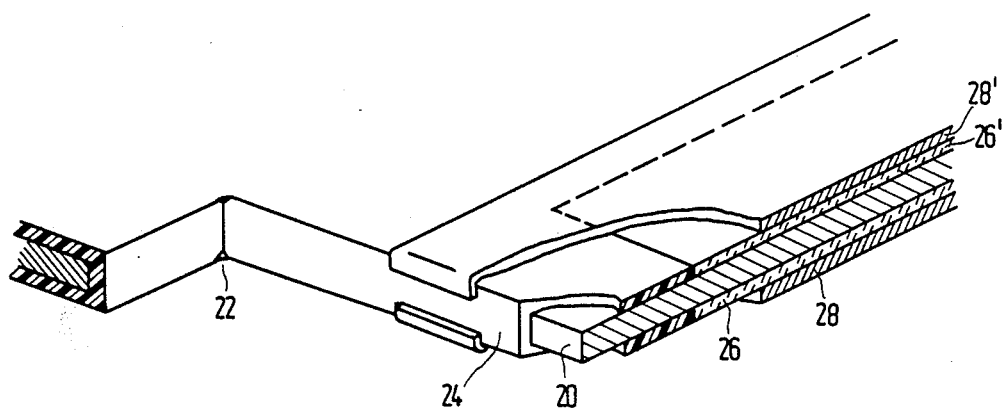
FIG. 2 is an elevational view, partly in section and partly broken away of a capacitive element of the invention.

FIG. 2 shows an anode foil 20 having pores and an oxide film, not shown in the drawing, at the location of a perforation 22 which is provided to establish a cathode contact. Inactive portions of the foils are coated with an insulating layer 24, the active portions are coated with porous spacing layers 26, 26' which are impregnated with solid electrolytic material.

In FIG. 2, cathode contacts 28, 28' are provided from the active portions of the surface up to and over the edge of the perforation 22 in FIG. 2. For this purpose, a conductive adhesive which is known per se, for example a silver paste containing an epoxy resin as the binder may be used. If desired, a metal layer may alternatively be provided by means of vacuum deposition, or a layer of the above-described paste comprising a solid electrolytic material to which a metal powder, for example silver, is added may be used.

The anode foil and the layers provided thereon are removed from the transport frame and completely coated on both sides with adhesive, for example an epoxy resin. A number of foils (for example 5 to 10) are stacked, if desired, the stack being provided with a base plate and a cover plate, preferably of an insulating material, after which the adhesive is made to cure. Subsequently, the plate is cut into strips in only one direction, alternately cutting through the perforations and through the anode foil.

Figure 3:
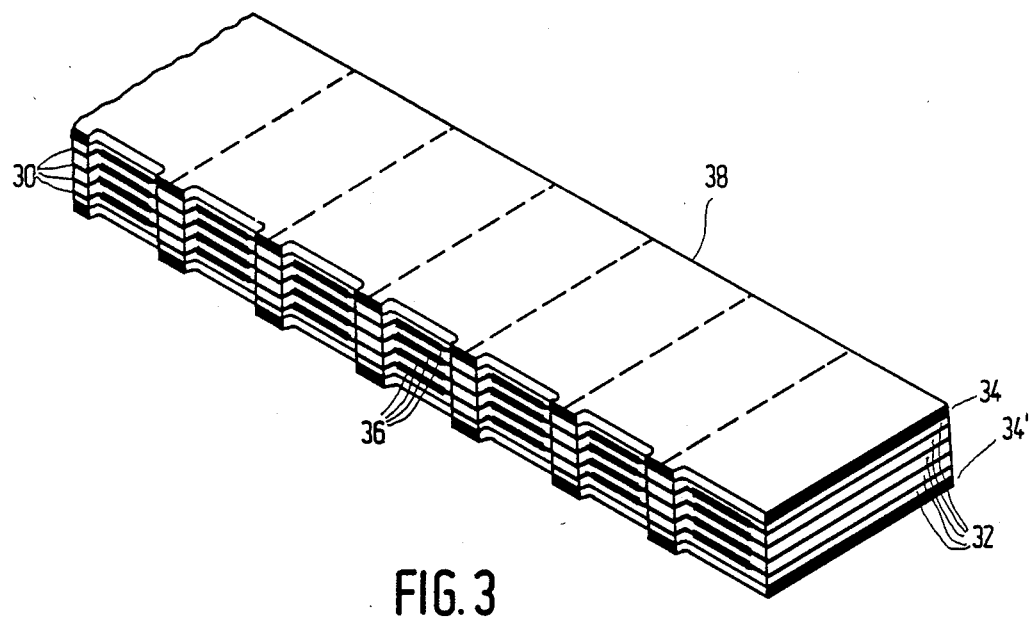
FIG. 3 is a diagrammatic elevational view of a stack of capacitor elements provided for a number of capacitors of the invention.

FIG. 3 shows a strip of capacitor blocks comprising anode foils 30 and adhesive layers 32 between the anode foils, as well as base and cover plates 34, 34'. The cathode contacts 36 are accessible at the location of the perforations, on the other side 38 of the strip the anode foil is accessible for the provision of electric connections.

The capacitors are provided with end contacts in a method which is known per se, for example by means of a conductive adhesive such as silver paste, or by vacuum deposition to form a metal layer by metal spraying or, on the anode side, by laser welding. If desired, the electric contact on the anode side can be improved in that an etching operation is carried out locally before the end contact is provided, manganese dioxide to which, for example, a mixture of citric acid and hydrogen peroxide is added being used as the contact material.

Figure 4:
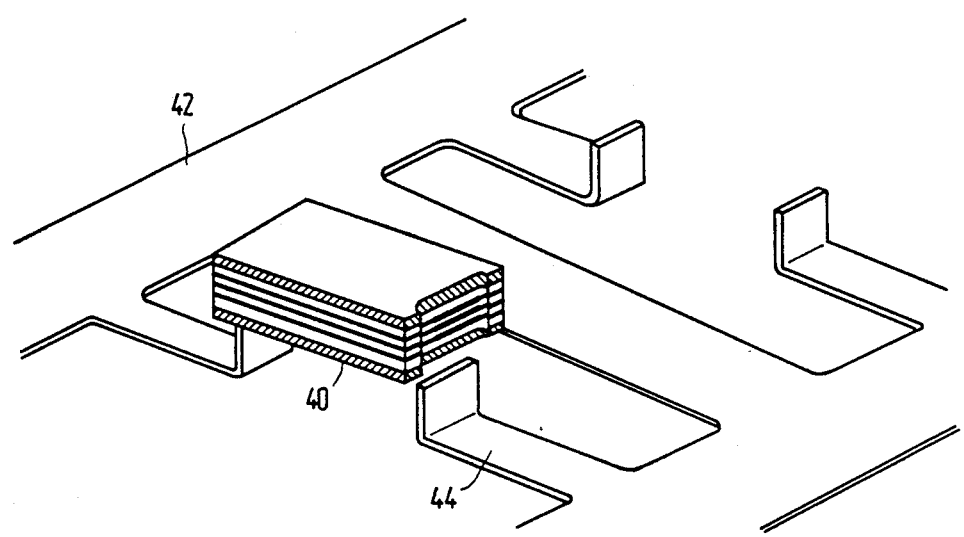
FIG. 4 is a diagrammatic elevational view of an electrolytic capacitor of the invention located over a mounting frame.

Subsequently, the strips are cut in a second direction to form separate capacitors, for example, having dimensions of $5 \times 8$ mm$^2$ and a thickness of 3 mm. FIG. 4 shows a capacitor 40 which is ready to be secured to a mounting frame 42 of, for example, brass, tin-plated iron or tin-plated copper. The secure the capacitor to the mounting frame use is made of a conductive adhesive. This step can be combined with the provision of the end contacts.

The capacitors can be enveloped in an insulating synthetic resin in a customary manner by means of moulding or extrusion coating operations. The lugs 44 of the mounting frame can be used to bring out the electric connections.

We claim:

1. An electrolytic capacitor comprising a stack of capacitor elements, each capacitor element comprising an anode foil having a dielectric oxide layer as well as a cathode contact layer having a solid electrolytic material, characterized in that the cathode contact layer has a porous ceramic spacing layer which is impregnated with the solid electrolytic material.

2. An electrolytic capacitor as claimed in claim 1, characterized in that in accordance with a desired pattern, the surface of the anode foil is divided into active and inactive portions, the active portions being covered with the cathode contact layer, and the inactive portions of the surface and a portion of the edges of the anode foil being coated with an insulating layer to which an electrically conductive layer is applied which extends from an insulated edge of the foil to an active portion of the surface.

3. An electrolytic capacitor as claimed in claim 2, characterized in that the electrically conductive layer at least partly covers the insulated edge of the foil.

4. An electrolytic capacitor as claimed in claim 2, characterized in that the cathode contact layers of the capacitor elements in the stack are interconnected through the electrically conductive layers at the edge of the foils.

5. An electrolytic capacitor as claimed in claim 1, characterized in that the surface of the anode foil exhibits active portions on both sides.

6. An electrolytic capacitor as claimed in claim 1, characterized in that the anodes of the capacitor elements in the stack are connected to one another through uninsulated edges of the foil.

7. An electrolytic capacitor as claimed in any claim 1, characterized in that the solid electrolytic material comprises a TCNQ salt.

8. An electrolytic capacitor as claimed in claim 1, characterized in that capacitor elements having highly etched and little-etched anode foils are used which are arranged parallel to one another in the stack.

9. A method of manufacturing an electrolytic capacitor in which a number of capacitor elements are manufactured from an anode foil provided with a dielectric oxide layer comprising:
   (a) applying a porous ceramic spacing layer to selected portions of the surface of said anode foil in accordance with a desired pattern;
   (b) impregnating said porous ceramic spacing layer with a solid electrolytic material thereby forming a cathode contact layer on said selected portions of said anode foil;
   (c) providing the remaining portions of the surface of said anode foil and a part of edges of said anode foil with an insulating layer;
   (d) providing said insulating layer with an electrically conductive layer, said electrically conductive layer extending from an insulated edge of said anode foil to said cathode contact layer thereby forming capacitor elements; and
   (e) forming a number of said capacitor elements into a stack.

10. A method as claimed in claim 9, characterized in that the cathode contact layers of the capacitor elements in the stack are connected to one another through an end contact.

11. A method as claimed in claim 9, characterized in that the anodes of the capacitor elements in the stack are connected to one another through an end contact.

12. A method as claimed in claim 11, characterized in that the portions of the stack to be contacted are etched before the end contacts are provided.

13. A method as claimed in claim 9, characterized in that the porous spacing layer is provided by means of screen printing.

14. A method as claimed in any claim 9, characterized in that the solid electrolytic material is provided by means of screen printing.

* * * * *